R. S. HEISE.
BICYCLE PEDAL.
APPLICATION FILED APR. 29, 1920.
1,366,076. Patented Jan. 18, 1921.
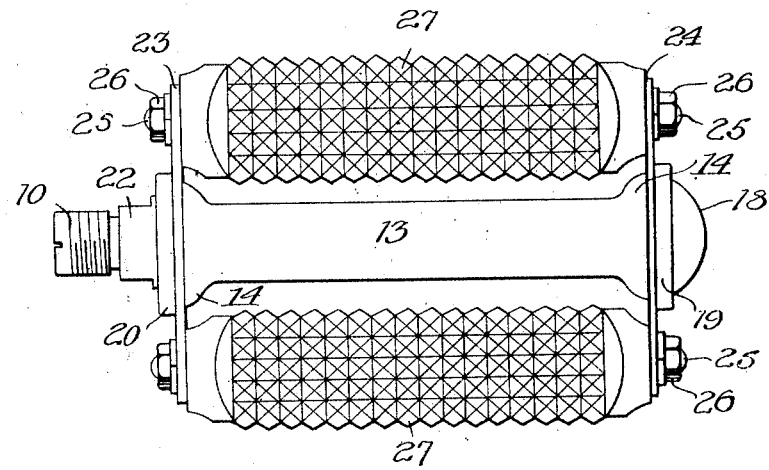
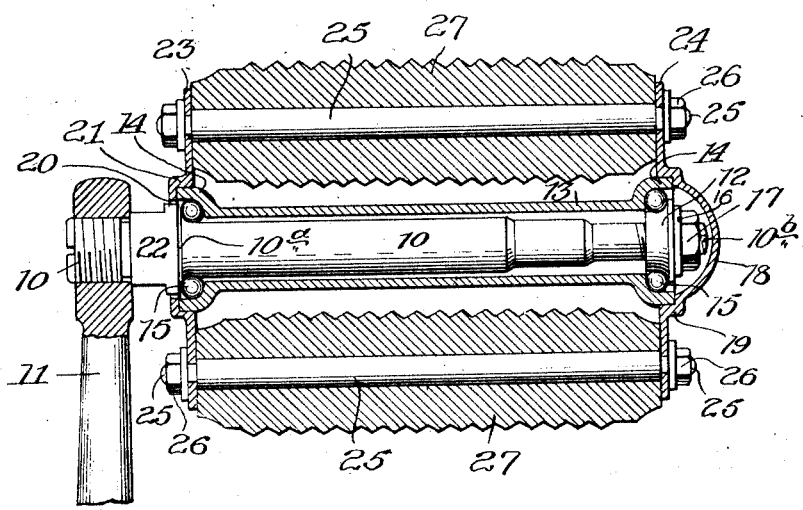
Inventor:
Roscoe S. Heise,

UNITED STATES PATENT OFFICE.

ROSCOE S. HEISE, OF MIDDLETOWN, OHIO, ASSIGNOR TO MIAMI CYCLE & MFG. CO., OF MIDDLETOWN, OHIO, A CORPORATION OF OHIO.

BICYCLE-PEDAL.

1,366,076.

Specification of Letters Patent.

Patented Jan. 18, 1921.

Application filed April 29, 1920. Serial No. 377,449.

*To all whom it may concern:*

Be it known that I, ROSCOE S. HEISE, a citizen of the United States, residing at Middletown, in the county of Butler and State of Ohio, have invented a new and useful Improvement in Bicycle - Pedals, of which the following is a specification.

This invention relates to bicycle pedals.

An object of this invention is to provide a bicycle pedal of the ball bearing type which is simple and neat in construction and which at the same time, is strong and rigid.

This is accomplished by this invention which is fully described in the following specification and shown in the accompanying drawing in which—

Figure 1 is a front elevation of a pedal embodying the invention, and Fig. 2 is a longitudinal section through the pedal.

The pedal is supported on an axle 10 which is secured in any desired manner to the crank 11. This axle has an integral cone $10^a$ formed thereon near its inner end and carries a cone 12 which is screwed on the threaded outer end of the axle. A sleeve 13 having an integral bearing cup 14 at each end, surrounds the axle 10 while balls 15 are placed between these cups and the cones $10^a$ and 12 to form ball bearings.

The threads on the outer end of the axle 10 are interrupted by a small key way $10^b$ in which is adapted to slide a finger (not shown) which extends from the inner edge of the washer 16. Adjustment of the bearings is made by turning the cone 12 to the desired degree of tightness when it is locked by means of the lock nut 17.

A dust cap 18 surrounds the outer end of the axle and bearing and has a counter sunk portion 19 snugly fitting over the outer bearing cup 14 thereby completely inclosing the outer ball bearing, and forming a dust proof cap therefor.

A similar dust proof cap is provided for the inner ends of the bearing, a counter sunk portion 21 of which fits snugly over the inner end or inner cup 14. This dust cap has a round central opening which is given a good running fit on the enlarged portion 22 of shaft 10. By this means very little dust is permitted to enter the bearing at the inner end of the pedal.

Outwardly extending ears 23 are provided on the dust cap 20 and similar ears 24 on the dust cap 18. These carry the pedal rods 25 which extend through openings therein and are secured thereto by means of nuts 26, and are shouldered in such a way that when the nuts 26 are drawn down tightly, the dust caps will be drawn firmly over the ends of the tube 13. Each of the pedal rods carries a pedal rubber 27 which may be of any suitable form.

While I have shown and described but a single embodiment of my invention, it is to be understood that it is capable of many modifications. Changes, therefore, in the construction and arrangement may be made which do not depart from the spirit and scope of the invention as disclosed in the appended claims in which it is my intention to claim all novelty inherent in the invention as broadly as possible in view of the prior art.

What I claim as new and desire to secure by Letters Patent is:

1. In combination, an axle, a sleeve surrounding said axle, integral cups formed in the ends of said sleeve, cones on said axle, balls operable between said cups and cones, and members removably secured to the open ends of said sleeve and acting as dust protectors therefor.

2. In combination, an axle, a sleeve surrounding said axle, integral cups formed in the ends of said sleeve, cones on said axle, balls operable between said cups and cones, and members removably secured to the open ends of said sleeve and acting as dust protectors therefor; one of said members completely inclosing the outer end of said sleeve.

3. In combination, an axle, a sleeve surrounding said axle, integral cups formed in the ends of said sleeve, cones on said axle, balls operable between said cups and cones, and members removably secured to the open ends of said sleeve and acting as dust protectors therefor; one of said members having an opening concentric with said axle and closely surrounding the inner end of the same whereby dust will be excluded therefrom.

4. In a bicycle pedal, an axle, a sleeve surrounding said axle, integral cups formed in the ends of said sleeve, cones on said axle, balls operable between said cups and cones, a member having a counter sunk portion snugly fitting over each end of said sleeve, a projection at each side of each of said members and means connecting said projections to secure the members to the sleeve.

5. In a bicycle pedal, an axle, a sleeve surrounding said axle, integral cups formed in the ends of said sleeve, cones on said axle, balls operable between said cups and cones, the central portion of said sleeve being smaller than the cups and the cups being of substantially the same size.

6. In a bicycle pedal, an axle, a sleeve surrounding said axle, integral cups formed in the ends of said sleeve, cones on said axle, balls operable between said cups and cones, a member having a counter sunk portion snugly fitting over each end of said sleeve, a projection at each side of each of said members and rods connecting said projections to secure the members to the sleeve.

7. In a bicycle pedal, an axle, a sleeve surrounding said axle, integral cups formed in the ends of said sleeve, cones on said axle, balls operable between said cups and cones, a member having a counter sunk portion snugly fitting over each end of said sleeve, a projection at each side of each of said members, rods connecting said projections to secure the members to the sleeve, and pedal rubbers on said rods.

8. In a bicycle pedal, an axle, a sleeve surrounding said axle, integral cups formed in the ends of said sleeve, cones on said axle, balls operable between said cups and cones, a member having a counter sunk portion snugly fitting over each end of said sleeve, a projection at each side of each of said members and pedal rods connecting said projections to secure the members to the sleeve.

9. In a bicycle pedal, an axle, a sleeve surrounding said axle, cups in the ends of said sleeve, cones on said axle, balls operable between said cups and cones, a member having a counter sunk portion snugly fitting over each end of said sleeve, a projection at each side of each of said members and means connecting said projections to secure the members to the sleeve.

10. In a bicycle pedal, an axle, a sleeve surrounding said axle, cups in the ends of said sleeve, cones on said axle, balls operable between said cups and cones, a member having a counter sunk portion snugly fitting over each end of said sleeve, a projection at each side of each of said members and pedal rods connecting said projections to secure the members to the sleeve.

ROSCOE S. HEISE.